Figure 1:
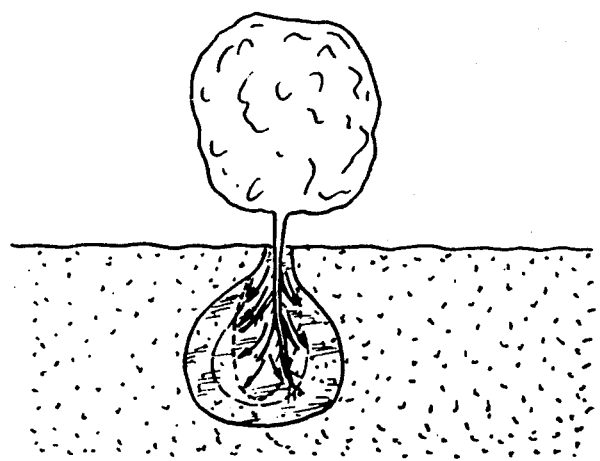

United States Patent [19]
Aymé de la Chevrelière

[11] 4,026,467
[45] May 31, 1977

[54] IRRIGATION CONTROL APPARATUS
[76] Inventor: Charles J. M. Aymé de la Chevrelière, 21, Avenue de Madrid, Neuilly-sur-Seine, France
[22] Filed: Apr. 12, 1976
[21] Appl. No.: 674,511
[30] Foreign Application Priority Data
Apr. 11, 1975 France .............................. 75.11340
[52] U.S. Cl. ..................................... 239/63; 73/73; 324/65 P
[51] Int. Cl.² ................... A01G 27/00; B05B 12/12
[58] Field of Search ............... 239/1, 63, 64; 73/73; 324/65 R, 65 P; 222/52; 47/1 R

[56] References Cited
UNITED STATES PATENTS 2,768,028  10/1956  Robinson ........................ 239/63 X
3,944,916  3/1976  Tillander ........................ 239/63 X

FOREIGN PATENTS OR APPLICATIONS 1,165,652  10/1969  United Kingdom ................. 239/63

Primary Examiner—Robert S. Ward, Jr.

[57] ABSTRACT

An irrigation control apparatus, particularly suited to drop-by-drop irrigation, is provided and which comprises an assembly for electrically controlling the starting and stopping of an irrigation system by means of two electrodes which are spaced both vertically and laterally from each other. A "bulb" of humid soil is produced during irrigation and the upper electrode of the two is laterally off-set with respect to the axis of symmetry of the bulb, by a distance equal to at least half of the maximum radius of the bulb, and is situated at the upper limit of the bulb. The lower electrode of the two is arranged in a diametrically opposite position, at a point laterally off-set with respect to the said axis, but in the inverse sense, also by at least half the maximum radius of the bulb and is situated at the lower limit of the bulb.

The precise relative positions of the electrodes are determined by the shape of the bulb which in turn depends on the nature of the soil to be irrigated.

1 Claim, 3 Drawing Figures

IRRIGATION CONTROL APPARATUS

In U.S. Pat No. 3,905,551 an irrigation control apparatus is described constituted by two electrodes measuring the electrical resistance of the soil, these two electrodes being spaced laterally and vertically.

In the arrangement described in the said Patent, the object was to re-establish the continuity of the hygrometric state of the soil and to that end, the lower electrode was placed at a sufficient depth so as to be within the layer of soil at a permanent humidity.

This arrangement is perfectly satisfactory for sprinkler irrigation installations but requires an adaptation for its application to the particular irrigation case known as "drop by drop."

In the case of such an irrigation an attempt is not made to humidify the whole of a layer of soil but simply to maintain a humidity in the zone where the roots are located.

It is known, that when a drop by drop irrigation is used, a humid volume having largely the shape of an onion and which is called the bulb is formed at the point of fall of the drops; it is also known that this bulb is elongated to a greater or smaller extent in the vertical sense according to te filtering properties of the soil, taking the form somewhat akin to a cylinder in sandy soils and a form somewhat akin to a lens arranged flat in very consolidated soils.

Thus is would clearly appear that in arranging the two electrodes as described in the main Patent, the formation of the bulb could only be controlled by placing them in a manner appropriate with respect to the said bulb.

The control apparatus in accordance with the present invention comprises a device for releasing the water feed controlled by two electrodes separated laterally and vertically, characterized by the fact that the upper electrode is placed at a point which is at the same time laterally off-set with respect to the axis of symmetry of the bulb in such a manner as to be at a distance equal to at least half of the maximum diamter of the bulb and situated at the upper limit of the bulb; whilst the lower electrode is in a position diametrically opposite, that is to say at a point laterally off-set in the inverse sense by at least half of the radius of the bulb and situated at the lower limit of the bulb.

By way of example, and so as to facilitate comprehension of the invention, there is represented in the accompanying drawings:

FIG. 1 a diagrammatic view of a section of soil illustrating a plant irrigated in accordance with the drop by drop method.

Figure 2:
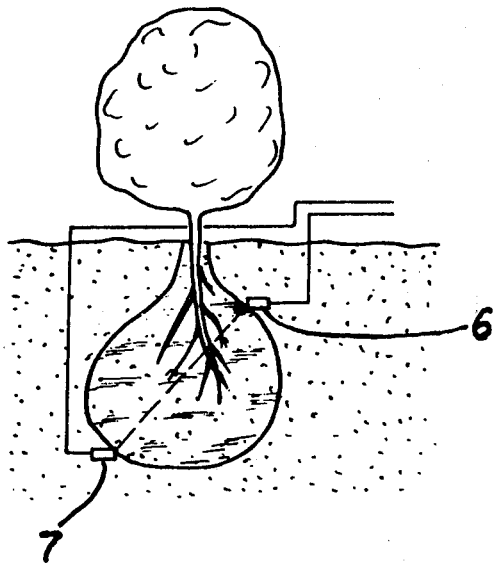

FIG. 2 a diagrammatic view illustrating a bulb and the electrodes placed in accordance with the present addition specification.

Figure 3:
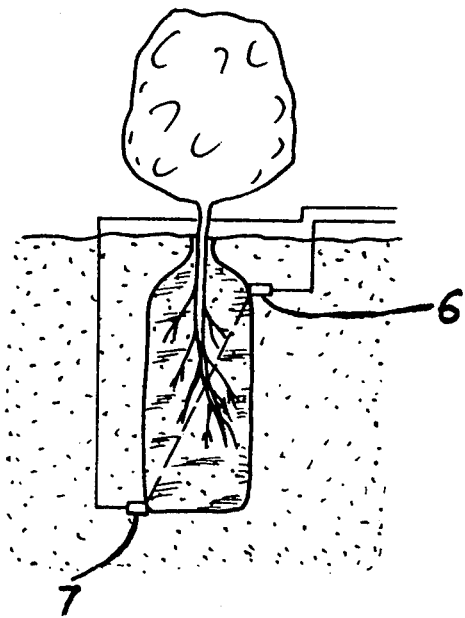

FIG. 3 a diagrammatic view illustrating a variant.

In a diagrammatic fashion, FIG. 1 shows the manner in which the water which is delivered drop by drop is distributed within the soil. It can be seen, that, in the beginning, the humidified zone takes a substantially ovoid form and that gradually the volume is increased towards the base and tends to take a form very like an onion, that is why this humid pocket is called after current fashion the bulb.

It is well known that the form of the bulb will vary according to the filtration properties of the soil and also that in very filtering soils the bulb takes the form of a cylinder extended in the vertical sense whilst in very consolidated soils it takes the form of a flat lens.

Theoretically, irrigation drop by drop may be effected in a continuous manner but it has proved to be preferable to effect a regulation in such a manner as to conserve a shape and volume of the bulb at the same time adapted to the nature of the soil and to the volume occupied by the roots and rootlets.

Referring to FIG. 2, it can be seen that in order to obtain this result, the upper electrode 6 is placed at a point which is off-set laterally by a distance which corresponds approximately to half the size of the bulb and which is practically at the upper limit of the said bulb; whereas the lower electrode 7 is located in a diametrically opposite position, that is to say off-set laterally from the other side by about half the size of the bulb and practically at the lower limit of the bulb.

Also, when the bulb reaches the two electrodes 6 and 7, irrigation is automatically stopped and when the zone included between the two electrodes 6 and 7 is too dry irrigation is set in operation again.

The relative positions of the electrodes 6 and 7 have to be adapted as a function of the shape of the bulb, which itself depends on the nature of the soil.

Thus, as is shown in FIG. 3, is the case of a very filtering sandy soil, the electrodes will be situated at practically the highest point and lowest point of the cylinder and at the ends of the opposite radii of the said cylinder.

Thus it would clearly appear that by arranging the electrodes 6 and 7 judiciously the size of the bulb and to a certain extent its shape, can be controlled.

What is claimed is:

1. An improved irrigation control apparatus, comprising an assembly electrically controlling the starting and stopping of an irrigation installation through the agency of two electrodes measuring the electrical resistance of the soil, the said two electrodes being simultaneously spaced from one another laterally and vertically, the improvement comprising an upper electrode placed at a point which is laterally offset with respect to the axis of symmetry of the bulb formed by drop by drop irrigation, at a distance equal to at least half of the maximum radius of the bulb and situated at the upper limit of the said bulb; and a lower electrode disposed in a diametrically opposite position, at a point laterally offset in the inverse sense by at least half of the maximum radius of the bulb and situated at the lower limit of the said bulb.

* * * * *